Dec. 2, 1969       T. L. GRAY       3,481,414
HYDRAULIC WEIGHER WITH TORSION-COUNTERBALANCED SUMMATION BAR
Filed April 8, 1968                2 Sheets-Sheet 1

Tommy L. Gray
INVENTOR.

BY
ATTORNEY

Dec. 2, 1969     T. L. GRAY     3,481,414
HYDRAULIC WEIGHER WITH TORSION-COUNTERBALANCED SUMMATION BAR
Filed April 8, 1968     2 Sheets-Sheet 2

Tommy L. Gray
INVENTOR.

BY
ATTORNEY

United States Patent Office 3,481,414
Patented Dec. 2, 1969

3,481,414
HYDRAULIC WEIGHER WITH TORSION-COUNTERBALANCED SUMMATION BAR
Tommy L. Gray, Dallas, Tex., assignor to General Electrodynamics Corporation, Garland, Tex., a corporation of Texas
Continuation-in-part of application Ser. No. 653,482, July 14, 1967. This application Apr. 8, 1968, Ser. No. 719,558
Int. Cl. G01g 5/04, 3/00, 1/38
U.S. Cl. 177—209                                                    23 Claims

ABSTRACT OF THE DISCLOSURE

Apparatus for weighing a load including hydraulic load cells to support the load, the pressure of the hydraulic fluid of the load cells being applied to pistons on a sum bar which adds the piston forces and applies part of the resultant force to a torsion bar. A stop limits the movement of the sum bar and absorbs the remainder of the resultant force. The load is measured by measuring the amount of twist necessary to be put into the torsion bar to overcome the force applied to the sum bar through the hydraulic system.

CROSS REFERENCE TO RELATED APPLICATION

This application is a continuation-in-part of my application Ser. No. 653,482 filed July 14, 1967, and now abandoned.

BACKGROUND OF THE INVENTION

Field of the invention

This invention relates to apparatus for measuring weights with a high degree of accuracy, and more particularly it relates to such apparatus in which the resiliency of a torsion bar is made use of.

Description of the prior art

There are in the prior art weighing devices which utilize the torsion principle. For example, such devices are shown in U.S. Patents 2,124,968 and 2,641,460. However, such devices as heretofore known are very crude and lack the sensitivity and the precision which is necessary in many applications of weighing devices today. It is also known in the prior art to utilize hydraulic load cells in weighing devices. Such load cells are usually engaged by a linkage system as shown, for example, in my Patent No. 3,191,701, but other prior art systems have applied the hydraulic pressure in the load cells to a single element where the pressures are added together to determine the amount of load on the cells. For example, such devices are shown in U.S. Patents 2,093,141, 2,596,032, and 2,684,594. None of these prior art devices, however, have had the wide application, the extreme sensitivity, and the high degree of accuracy which are obtainable from the novel weighing device of the present invention.

SUMMARY OF THE INVENTION

According to the present invention, loads are weighed by applying them through a hydraulic load cell or other load-responsive device to an element which is attached to a torsion bar. Preferably several such load-responsive devices are used, and a force proportional to sum of the loads on these devices is applied to the element. The element is pivotable about an axis passing through its point of connection to the torsion bar. The torsion bar is preferably held against movement at another point, so that the application of a moment to it through the element causes flexing of the torsion bar. Preferably the amount of flexure, as well as the amount of moment on the torsion bar resulting from the load, are limited by a stop which is engaged by the element after the torsion bar has been flexed only a small amount. To measure the load, the torsion bar is then further flexed in a manner to bring the element back to its original position. The amount of such further flexing required is an indication of the load.

BRIEF DESCRIPTION OF THE DRAWING

FIGURE 1 of the drawing illustrates one embodiment of the invention as applied to one possible application thereof. As there shown, a load 10 is resting upon a scale platform 12 which is mounted upon load-responsive devices comprising hydraulic load cells 20, the load cells being supported by a suitable supporting surface 11. The load cells are connected through hydraulic line 50 to a force transmission block 60.

The load cells used may be one of the several suitable types known in the art, but preferably are hydraulic load cells of a type which operates with very little movement and very little friction. An example of such a load cell is shown in my U.S. Patent No. 3,191,701, and a suitable variation thereof is shown in FIGURE 2 herein.

Figure 2:
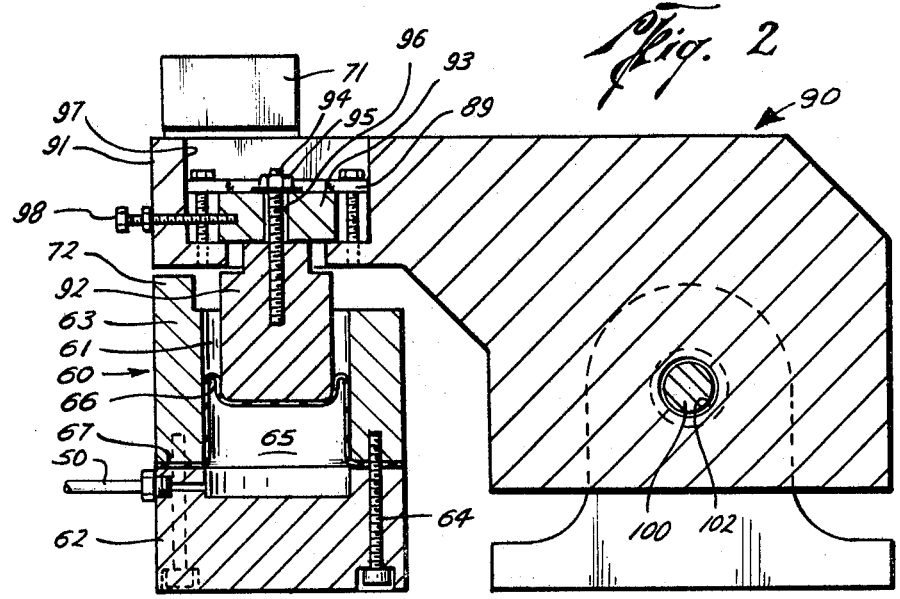
FIGURE 2 is a vertical sectional view of a portion of the apparatus of FIGURE 1, taken at line 2—2 of FIGURE 1.

FIGURE 2 illustrates a sectional view of apparatus according to this invention, the section being taken through one of the cylinders 61 of the force transmission block 60. As there shown, a hydraulic line 50 is connected into a lower portion 62 of the force transmission block which is fastened to the upper portion 63 thereof as by means of cap screws 64. A portion of a hydraulic fluid cavity 65 is formed in the lower portion 62 of the force transmission block and the remainder of this cavity is formed in the upper portion 63 thereof. A frictionless diaphragm of the type marketed under the trademark Bellofram, shown at 66 herein, separates the cavity 65 from the remainder of the cylinder 61, and has its flange 67 sealingly received between elements 62 and 63.

The force transmission block 60 is, in the embodiment shown, positioned beneath an overhanging arm 91 of a sum bar 90. The sum bar constitutes an element for receiving the forces resulting from the load portions transmitted to all of the load cells 20, and for adding these forces together. It is apparent from the drawing that the hydraulic fluid in the load cells is pressurized by the load on the platform 12, and this fluid pressure is transmitted through the hydraulic lines 50 to the fluid cavities 65 in the force transmission block, there preferably being a separate cavity 65 in the force transmission block for each of the load cells 20. These forces are transmitted upwardly to the sum bar through pistons 92 which depend from the overhanging portion 91 of the sum bar and extend downwardly into the cylinders 61 and into engagement with the diaphragms 66. The pistons are, of course, made small enough in relation to the diameter of the cylinders 61 to allow the convolutions of the diaphragm to fit between each piston and the cylinder wall. All of the pistons 92 are mounted on a block 93, as by means of studs 94 and nuts 95, the studs extending through openings 96 in the block which are large enough to allow lateral adjustment of the position of the piston relative to the block. The block 93 is received within an elongate well 97 which extends lengthwise of the sum bar, and is clamped in position by clamps 89. The lateral position of the block with respect to the sum bar may be adjusted as by means of cap screws 98 which extend through the wall forming the outer edge of the well 97.

An upper stop 71 is rigidly fastened to support structure (not shown), and has a portion overhanging the sum bar to limit its upward movement. A lower stop 72 on top of the force transmission block limits downward movement.

The main body portion of the sum bar 90 has a tubular extension 99 extending from one end a tubular extension 101 extending from the other end, the extensions providing a pivotal mounting of the sum bar in bearings 106. The tubular extensions are in alignment with each other and serve to join a longitudinal bore 102 extending through the sum bar. The longitudinal bore has a reduced diameter portion 103 within the tubular extension 99 which is sized for a close fit with a torsion bar 100. The torsion bar is rigidly attached to the sum bar at the end having the extension 99, as by means of the pin 104 extending through both the extension and the sum bar. The torsion bar, however, extends freely through the remainder of the bore 102 and out the end of the extension 101 to a point where it is mounted in a bearing whose base is shown at 110.

Between the extension 101 and the bearing 110 a worm wheel 80 is rigidly affixed to the torsion bar 100. The worm wheel 80 is operably engaged by a worm 81 which is mounted on shaft 82, these elements being rotatably supported by a suitable frame, which is not shown. The shaft also has mounted thereon a worm wheel 84 which is operably engaged by a worm 85. The worm 85 is mounted on a shaft 86 to which a crank 87 is connected by means of a dog clutch 88. An electric motor 79 is also connected in driving relation with the shaft 86.

The shaft 82 is also drivingly connected to a counter 120 which preferably is provided with a zero reset knob 121.

Mounted on top of the sum bar and extending therefrom in a direction away from the torsion bar is an indicator arm 130 having a flag 131 on its end. Positioned adjacent the indicator arm 130 is a narrow beam light 132 mounted on a stand 133 in such a location that the light can be directed past the edge of the flag 131 toward a screen 132. The screen is provided with indicia such as the zero and the numbers and lines shown to show the vertical position of the flag 131 as it moves up and down in front of the light 132.

Figure 1:
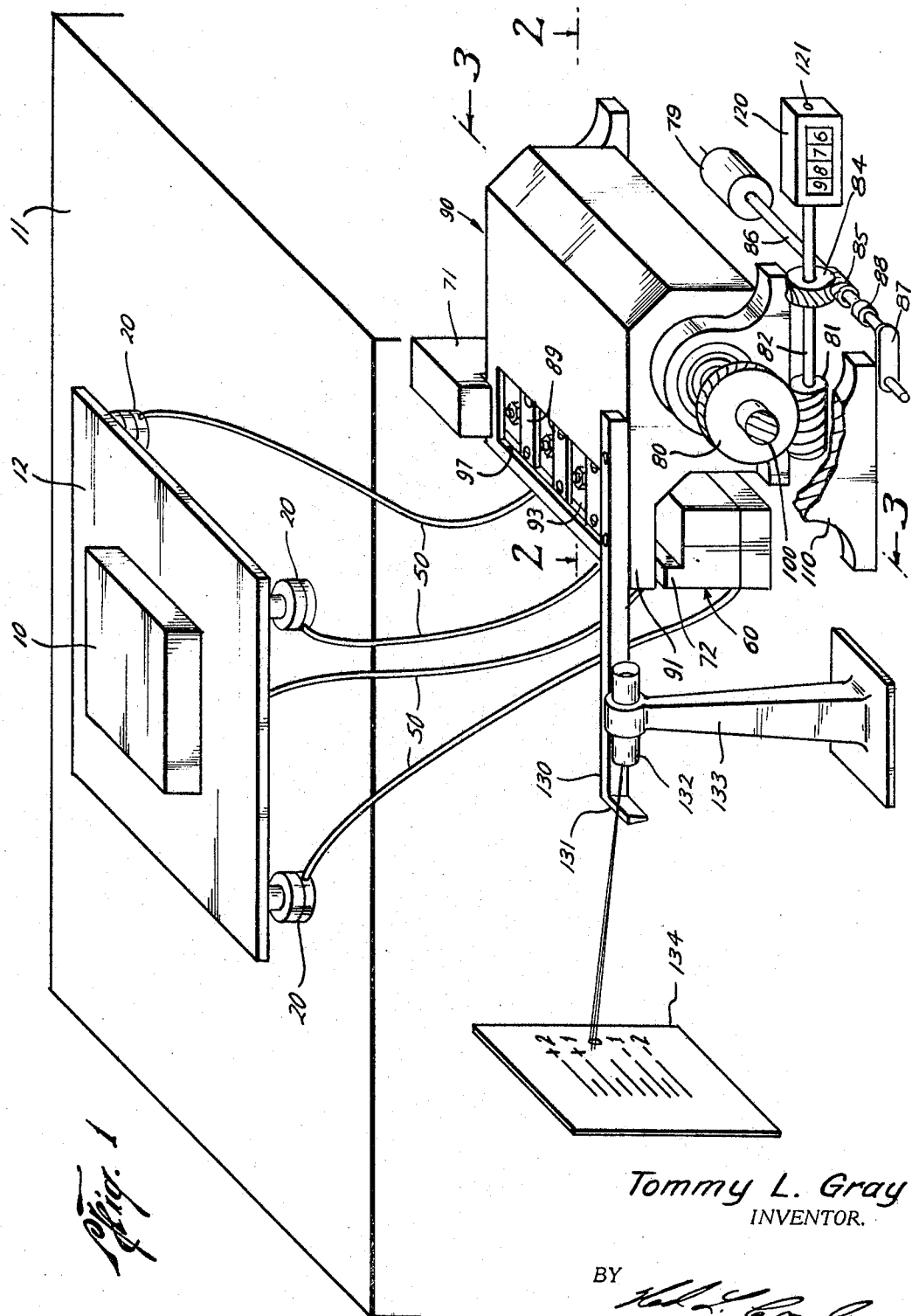
FIGURE 1 is a perspective view of a preferred embodiment of the invention, parts being broken away for clarity.
Figure 3:
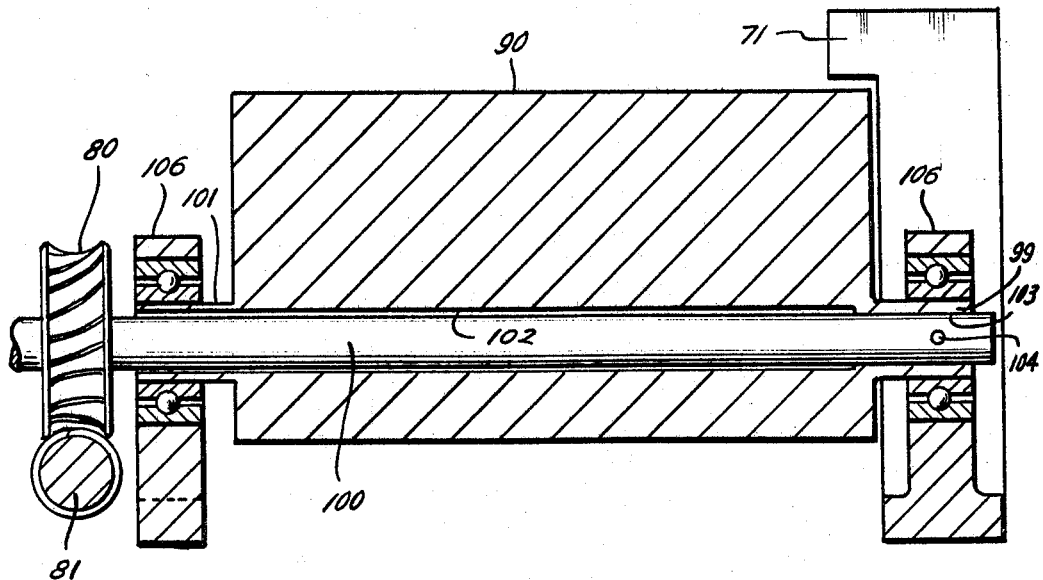
FIGURE 3 is a vertical sectional view of a portion of the apparatus of FIGURE 1, taken at line 3—3 of FIGURE 1.

To use the apparatus, the sum bar is first positioned between the upper and lower stops 71 and 72, with the shadow of the flag 131 at zero on the chart 134. This is the null position with no load on the platform. When the load 10 is applied, it exerts a pressure on the hydraulic fluid in the four load cells 20, and the pressure from each load cell is transmitted to a separate cavity 65 in the force transmission block 60. The pressures are thereby applied against the pistons 92 so that all of the forces are exerted upwardly against the overhanging portion 91 of the sum bar 90, thus applying a moment to the sum bar about an axis corresponding to the center line of torsion bar 100. This moment has a tendency to cause the sum bar to rotate clockwise, as seen in FIGURES 1 and 2, and two means are used to counteract the moment applied by the load. First, as seen in FIGURE 3, the sum bar is pinned to the torsion bar at one end, and the torsion bar is prevented from rotating at the other end by the engagement of the worm wheel 80 with the worm 81. Thus, the forces applied from the force transmission block will flex or twist the portion of the torsion bar between the worm wheel 80 and the pin 104. In the preferred embodiment of the invention, this twisting will allow movement of the sum bar only until it engages the upper stop 71, which is preferably positioned only a very short distance, for example, 1/16 inch or less, above the upper surface of the sum bar. The upper stop is rigidly affixed to the surface supporting the mechanism and is built strong enough that it will have substantially no yield under the forces which may be applied to the sum bar. The sum bar itself should also be of very strong and heavy construction so as to substantially avoid any yield in the sum bar under the loads which are applied.

It is apparent that when the forces applied from the force transmission block have twisted the torsion bar enough for the top of the sum bar to engage the stop 71, the stop 71 will absorb any additional force which is applied and no further torque will be put on the torsion bar. However, by rotation of the crank 96 or the motor 99 the torsion bar can be rotated from the opposite end. If rotated counter clockwise, as viewed in FIGURE 1, it will be seen that a moment will be applied from the other end of the torsion bar which tends to counteract the load-induced moment already on the torsion bar and the sum bar. The sum bar is initially prevented from rotating because of the moment resulting from forces which are applied against it from the force transmission block. Thus, the end of the torsion bar connected to the sum bar is held stationary, so operation of the crank or the motor will cause further twisting of the torsion bar. This twisting will continue until the moment applied to the sum bar by this means almost equals the load-induced moment, when the sum bar will be pulled away from the upper stop 71. A slight additional twist will move the sum bar down to engagement with the lower stop 72, which extends upwardly from the force transmission block. The moment applied through the torsion bar which is just enough to return the sum bar to its original position between the two stops, so that the shadow of the flag 131 is again at zero, is a coupling moment for the load-induced moment which is applied to the sum bar from the force transmission block.

It will be seen that as the crank 96 or motor 99 rotates the end of the torsion bar, the counter 120 is also operated. This counter therefore gives a direct indication of the amount of twist applied to the torsion bar. In the preferred embodiments of the invention, where the amount of twist is a straight line function of the moment applied, the counter can be calibrated to give a direct reading of pounds, ounces or other units. Thus, it is apparent that when the torsion bar has been twisted far enough to move the sum bar away from the stop 71 and bring the shadow of the flag 131 to zero, the coupling moment is exactly equal to the moment exerted from the force transmission block, and at this point the counter 120 will give a reading indicative of the weight of the load 10.

In order to obtain accurate weighing of a load it is first necessary to zero the apparatus with the sum bar at a position between the upper and lower stops. This may be done by means such as the arm 130, the light 132, and the markings on the screen 134. These three elements are preferably so aligned that when the sum bar is substantially half way between the upper and lower stops the light will cast a shadow of the edge of the flag 131 at the zero line marked on the screen. Other markings above and below zero may be applied to the screen as shown to indicate specific weight increments above and below zero weight.

It will be appreciated that the weight of the scale platform 12 causse a pressure to be exerted upon the diaphragms 66 in the force transmission block, and thus it may be said that the tare weight applies an initial moment onto the sum bar, forcing it upwardly against the upper stop. To counteract this tare, the crank 96 or motor 99 may be operated enough to apply a coupling moment to bring the sum bar to zero position between the upper and lower stops, as indicated by the chart on screen 134. When this zero position is reached the counter 120 may be returned to zero by operation of a zero knob or device 121 as known in the art. Then, when a weight is applied to the platform, the crank 96 or motor 99 is operated to apply a coupling moment, the application of the counteracting twist being stopped when the shadow of the flag 131 on the screen 134 reaches the zero mark.

In the preferred embodiment of the invention, as illustrated in the drawing, the torsion bar is cylindrical in shape, since the degree of twist of a cylindrical shape is a straight line function of the moment applied. However, it will be appreciated that if suitable apparatus is utilized for determining the load from the amount of flexure, other shapes could be used.

The size and material of the torsion bar are necessarily selected so that the yield strength of the material will not be exceeded at the maximum capacity of the weighing apparatus. In other words, the torsion bar must be large enough that it will return to its original position without hysteresis loss upon release of the maximum moment which will be applied. It will therefore be obvious that the capacity of the weighing device may be readily changed by merely changing the size of the torsion bar.

It will be apparent also that changes in the capacity can be achieved by changing the size of the load cells 20, or by increasing the number of load cells supporting the platform 12. Thus, if the total load cell area is doubled the load on the platform may be doubled without increasing the pressure applied to the force transmission block. It is then only necessary to change the calibration of the counter 120 to double the capacity of the unit.

The use of the rolling diaphragm 66 is preferred over other types of pressure transmission devices because of the extremely low inertia and friction in this device. Furthermore, when such a diaphragm is used the piston 92 may be fastened directly to the sum bar, even though the piston does not move perfectly vertically but moves in an arc about the center line of the torsion bar. This is true because the rolling diaphragm is substantially unaffected by small lateral movements of the piston such as occur when the piston moves up and down only a short distance, and when the axis of the cylinder is substantially tangential to the arc of movement of the piston. In the preferred embodiment, the face of the piston is substantially horizontally aligned with the center line of the torsion bar, as in the embodiment shown in the drawing. It is seen that with the small vertical movement allowed between the upper and lower stops, and with the bottom face of the piston substantially aligned with the center line of the torsion bar, the total travel of the piston covers only a small arc and the lateral movement during this arc is only a minute amount. For example, if the vertical movement allowed between the upper and lower stops is 1/16 inch and the distance from the center line of the piston to the center line of the torsion bar is 6 inches, then the maximum lateral movement of the piston is about 0.00024 inch.

Because of this very small lateral movement the moment arm is substantially constant and no allowance need be made for variation in the moment arm due to the arc travelled by the piston.

The use of an upper stop is much to be preferred in the apparatus of this invention. It serves an important function in preventing shock loading of the torsion bar. This is due to the fact that, in a scale with 100 pounds capacity, for example, the first few ounces of load on the scale platform moves the sum bar up against the upper stop. It is only this initial load which is exerted on the torsion bar. Further loading of the platform merely increases the force against the upper stop and does not affect the loading on the torsion bar. The loading of the torsion bar thus occurs only upon rotation of the crank or motor to apply the coupling moment.

Another major function of the stop is the reduction of friction and hysteresis in the system by limiting the movement of the various elements. Furthermore, as previously noted, by limiting the vertical movement of the pistons 92, changes in the length of the moment arm caused by lateral movement of the pistons, are substantially eliminated.

In the preferred embodiment of the weighing apparatus of this invention it is not necessary that the load be centered on the platform because all of the weight of the load is applied to the various load cells, and the sum bar takes care of adding the loads together no matter how unequal they may be.

It will be appreciated that ordinary machining tolerances will result in differences in the diameters of the cavities 65 and pistons 92 so that the ratio of pressure to vertical force in each cavity is not necessarily the same. Such variations are readily compensated for in the embodiment of the apparatus shown herein by adjustment of the moment arm. Thus, in FIGURE 2 the nut 95 may be loosened so as to move the piston either to the left or to the right to change the distance between the center line of the piston and the center line of the torsion bar and thereby achieve a moment arm change which will compensate for any dimensional differences. When a rolling diaphragm is used such small adjustments do not affect the accuracy of the device.

It will also be seen that means has been provided for lateral adjustment of all of the pistons at once. Such means comprises the block 93 on which all of the pistons are mounted. By loosening the clamps 89, the block 93 may be moved laterally to adjust the moment arm as desired. It will be appreciated that the changing of this moment arm constitutes an adjustment of the ratio between the indicated load and actual load. Thus, if upon calibration of the weighing device it is found that the calibration line is too steep or too flat, thereby indicating an error in multiplication factor, this error may be corrected by adjustment of the location of the block 93.

Multiplication error may also be corrected by changing the length of the torsion bar. It will be appreciated, however, that this is much more difficult because it requires either moving the worm wheel 80 or the pin 104 longitudinally of the torsion bar.

It has been shown therefore that the accuracy of the apparatus of this invention may be accomplished by three different adjustments. The first is the zero adjustment which has previously been described, and the second is the multiplication adjustment. Finally, the shape of the calibration curve may be adjusted by changing the configuration of the torsion bar, as has previoulsy been described.

A very unexpected and unusual feature of the apparatus of this invention is the high degree of natural damping of the system, combined with a high inherent sensitivity and accuracy. No matter how the load is applied to the platform the arm 130 comes to a rest in a very short time, and usually in 1/10 second or less. Yet even with this unusually fast damping the apparatus is so sensitive that it will react to the addition of one ounce of weight to 100 pounds of weight on the platform.

Many modifications of the invention shown and described herein will be apparent to those skilled in the art. For example, the motor 99 may be a stepping motor designed in coordination with the counter so that each step of the motor represents one unit on the counter and therefore one unit of weight. The stepping motor then may be actuated by limit switches adjacent the upper and lower stops so that upward movement of the sum bar would close the switch to cause pulses to be fed to the stepping motor to rotate the motor in a forward direction, and contact of the sum bar with the limit switch on the lower stop would cause pulses to be fed to the stepping motor to cause it to rotate backward.

Alternatively, photo cells might be placed on the screen 134 above and below the null or zero line. These might be connected into the circuit of the motor so that if the light 132 hits the upper photo cell it signals the motor to move forward and if the light hits the bottom photo cell it signals the motor to move backward. If the upper photo cell the motor will be signaled to step one step above the null line and the lower photo cell is positioned slightly less than one full step below the null line, they might well be connected into the motor circuit so that on each step when the light is shining on the upper photo cell the motor will be signaled to step one step forward, and on each step when the light is shining on the lower photo cell the motor will be signalled to step one step backward. With such a system the motor would step forward, if the light is shining on the upper photo cell, until it is moved off of the upper photo cell. Then, if due to momentum it goes past the null line, it will be signaled to step backward to bring it back up to the null line.

It will therefore be apparent that any suitable means can be used for sensing the null position of the sum bar and for applying signals to the motor 99 to cause automatic weighing of any load applied on the platform.

Furthermore, rather than utilizing the counter 120 it will be apparent also that pulses fed to a stepping motor could be fed to a digital computer which could count the pulses in order to determine the load being weighed. Since the motor is moving in discrete steps, it could feed directly into an encoder which in turn could feed to a digital computer.

Another alternative would be to replace the counter with a printer so as to print out the load being weighed.

A further alternative would be to use an ordinary electric motor and utilize a star wheel or other mechanical means to obtain discrete steps rather than using a stepping motor.

I claim:
1. A weighing device comprising
load bearing means for supporting a load to be weighed,
a torsion bar held against movement at one point,
means connecting said load bearing means with said torsion bar at another point to apply a moment to said torsion bar proportional to a load on said load bearing means, whereby the torsion bar is flexed,
means opposing said moment for limiting flexing of the torsion bar and for absorbing the major proportion of said moment,
means engaging said torsion bar, at a position displaced from said other point adapted to apply a coupling moment to said torsion bar, whereby said torsion bar is further flexed,
and means for measuring the amount of further flexing necessary to counteract the load-induced moment.

2. A weighing device as defined by claim 1 wherein said moment is a twisting moment.

3. A weighing device as defined by claim 2 wherein said torsion bar is a cylinder.

4. A weighing device as defined by claim 1 wherein the means connecting the load-bearing means with the torsion bar comprises
a plurality of hydraulic load cells engaged by said load-bearing means,
a sum bar connected to said torsion bar,
and means for applying the pressures in all said load cells to said sum bar.

5. A weighing device as defined by claim 4 wherein said moment is a twisting moment, and
said torsion bar is a cylinder.

6. A weighing device as defined by claim 5 wherein the direction of application of said pressures to said sum bar is substantially at a right angle to the axis of said torsion bar.

7. A weighing device as defined by claim 6 wherein the pressures are applied to the sum bar through a plurality of pistons engaged by rolling diaphragms enclosing the hydraulic fluid pressurized in the load cells.

8. A weighing device as defined by claim 1 wherein the means connecting the load-bearing means with the torsion bar comprises
at least one hydraulic load cell engaged by said load-bearing means to pressurize hydraulic fluid,
a fluid cavity for receiving said pressurized hydraulic fluid,
a rolling diaphragm enclosing said fluid in said cavity,
a piston engaging said rolling diaphragm,
and a member rigidly connected between said piston and torsion bar.

9. A weighing device as defined by claim 8 wherein the force exerted upon the piston by the fluid pressure is substantially at a right angle to the centerline of the torsion bar.

10. A weighing device comprising
a scale platform,
a plurality of hydraulic load cells connected to said platform, whereby hydraulic fluid in each load cell is pressurized when a load is placed on the scale platform,
a sum bar mounted for movement upon the application of a force thereto,
means for applying to the sum bar forces proportional to the pressures on the hydraulic fluid in each load cell,
means engageable by the sum bar to limit the movement thereof,
a torsion bar having one end connected to said sum bar for movement therewith,
means on said sum bar positioned to indicate a no load position of said sum bar,
means connected to said torsion bar for twisting said torsion bar in a direction opposite to its movement by the sum bar,
and means for measuring the amount of twist required to bring said sum bar back to no load position.

11. A weighing device comprising
a scale platform for supporting a load to be weighed,
a plurality of hydraulic load cells supporting said platform, whereby hydraulic fluid in the load cells is pressurized when a load is placed on the scale platform,
a sum bar,
a piston and cylinder combination hydraulically connected to each load cell and engaging said sum bar to apply a force to said sum bar proportional to the load on the scale platform,
a cylindrical torsion bar having one end fixedly connected to said sum bar, the axis of said torsion bar extending at a right angle to and displaced away from the direction of application of said force to said sum bar, whereby said force is at a right angle to apply a twisting moment to said torsion bar,
stop means limiting the movement of said sum bar by said force, and absorbing the major proportion of said force,
a null indicator for indicating the position of the sum bar when there is no load on the scale platform,
means connected to the other end of the torsion bar for applying an opposite moment for further twisting said torsion bar,
and means for measuring the amount of further twisting necessary to bring the sum bar back to no-load position.

12. A weighing device comprising
load-bearing means for supporting a load to be weighed,
a hydraulic load cell engaged by said load-bearing means,
a torsion bar,
means connecting said load cell with said torsion bar to apply a moment to said torsion bar proportional to a load on said load-bearing means,
means engaging said torsion bar, at a position displaced from its point of connection with said load cell, adapted to apply a coupling moment to said torsion bar, whereby said torsion bar is flexed,
and means for measuring the amount of flexing necessary to counteract the load-induced moment.

13. A weighing device as defined by claim 12 and including
stop means positioned to allow a small but limited flexing of said torsion bar in response to the load-induced moment.

14. A weighing device as defined by claim 12 and including
means engaging said torsion bar, at a position displaced from its point of connection with said load cell, adapted to prevent flexing at said position in response to the moment resulting from the load.

15. A weighing device as defined by claim 14 and including
stop means positioned to allow a small but limited flexing of said torsion bar in response to the moment resulting from the load.

16. A weighing device as defined by claim 12 which includes
a plurality of said hydraulic load cells,
and means for applying the presures in all said load cells to the said means for connecting the load cells to the torsion bar.

17. A weighing device comprising
load bearing means for supporting a load to be weighed,
a torsion bar held against movement at one point,
a sum bar connected to said torsion bar at another point,
a plurality of load responsive devices engaging said load bearing means and said sum bar in such a way as to apply a moment to said sum bar, when a load is being weighed, which will cause flexing of the torsion bar between said points, each of said load responsive devices applying a portion of the moment to the sum bar,
means engaging said torsion bar, at a position displaced from said other point, adapted to apply a coupling moment to said torsion bar, whereby said torsion bar is further flexed,
and means for measuring the amount of further flexing necessary to counteract the load-induced moment.

18. A weighing device as defined by claim 17 and including
stop means positioned to limit the flexing of said torsion bar in response to the load-induced moment.

19. A weighing device, comprising:
load cell means for receiving a load thereon;
first piston means mounted on a torsion bar;
means linked to said torsion bar for causing rotation thereof; and
hydraulic means, connecting said load cell to said piston means, for transmitting fluid from said load cell means to said piston means.

20. The device of claim 19 wherein intermediate said load cell means and said first piston means there is force transmission means, said transmission means having means therein for causing movement of said first piston means.

21. The device of claim 20 wherein said movement causing means includes a diaphragm positioned in a cavity, said cavity being connected both to said hydraulic means and to said first piston means.

22. The device of claim 19 wherein the ends of said torsion bar are bearing mounted in a frame, and one end of said torsion bar is fixed relative to said first piston means.

23. The device of claim 22 wherein intermediate said torsion bar ends, said torsion bar is keyed to a gear train, said gear train linking said torsion bar and said rotation causing means.

References Cited

UNITED STATES PATENTS

| | | | |
|---|---|---|---|
| 2,482,027 | 9/1949 | Poole | 177—209 XR |
| 2,625,820 | 1/1953 | Whitehead et al. | 73—309 |
| 2,631,027 | 3/1953 | Payne | 177—212 XR |
| 3,084,551 | 4/1963 | Westman | 177—212 XR |
| 3,090,226 | 5/1963 | Corti et al. | 73—141 |
| 3,376,739 | 4/1968 | Thornton | 73—141 |

FOREIGN PATENTS

| | | |
|---|---|---|
| 688,606 | 3/1953 | Great Britain. |
| 844,170 | 8/1960 | Great Britain. |

ROBERT S. WARD, Jr., Primary Examiner

U.S. Cl. X.R.

73—141; 177—212, 225, 257